US011546377B2

(12) United States Patent
Boshmaf et al.

(10) Patent No.: US 11,546,377 B2
(45) Date of Patent: Jan. 3, 2023

(54) PHISHING DOMAIN DETECTION SYSTEMS AND METHODS

(71) Applicant: Qatar Foundation for Education, Science and Community Development, Doha (QA)

(72) Inventors: Yazan Boshmaf, Doha (QA); Mashael Al Sabah, Doha (QA); Mohamed Nabeel, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 0 days.

(21) Appl. No.: 17/229,386

(22) Filed: Apr. 13, 2021

(65) Prior Publication Data

US 2021/0320946 A1 Oct. 14, 2021

Related U.S. Application Data

(60) Provisional application No. 63/009,159, filed on Apr. 13, 2020.

(51) Int. Cl.
*H04L 29/06* (2006.01)
*H04L 29/12* (2006.01)
(Continued)

(52) U.S. Cl.
CPC .......... *H04L 63/1483* (2013.01); *G06F 21/50* (2013.01); *H04L 61/4511* (2022.05);
(Continued)

(58) Field of Classification Search
CPC .......... H04L 63/1483; H04L 29/06578; H04L 29/06897; H04L 61/1511; H04L 63/0823;
(Continued)

(56) References Cited

U.S. PATENT DOCUMENTS 10,104,113 B1 * 10/2018 Stein .................. H04L 63/1425
10,462,180 B1    10/2019 Ben David et al.
(Continued)

FOREIGN PATENT DOCUMENTS

WO    2018099219 A1    6/2018

OTHER PUBLICATIONS

Fasllija, et al.; "Phish-Hook: Detecting Phishing Certificates Using Certificate Transparency Logs"; Security and Privacy in Communication Networks, pp. 320-334 (Dec. 2019); (14 pages).
(Continued)

*Primary Examiner* — Muhammad Raza
(74) *Attorney, Agent, or Firm* — K&L Gates LLP

(57) ABSTRACT

The main objective of Certificate Transparency (CT) is to detect mis-issued certificates or rouge certificate authorities. It has been observed that phishing sites have been increasingly acquiring certificates to look more legitimate and reach more victims, thus providing an opportunity to predict phishing domains early. The present disclosure provides systems and methods for early detection of phishing and benign domain traces in CT logs. The provided system may predict phishing domains early even before content is available via time-, issuer-, and certificate-based characteristics that are used to identify sets of CT-based inexpensive and novel features. The CT-features are augmented with other features including passive DNS (pDNS) and domain-based lexical features.

15 Claims, 11 Drawing Sheets

(51) Int. Cl.
*H04L 9/40* (2022.01)
*G06F 21/50* (2013.01)
*H04L 61/4511* (2022.01)

(52) U.S. Cl.
CPC ...... *H04L 63/0227* (2013.01); *H04L 63/0823* (2013.01); *H04L 63/0876* (2013.01); *H04L 63/1425* (2013.01); *G06F 2221/2119* (2013.01)

(58) Field of Classification Search
CPC ................. H04L 63/0876; G06F 21/50; G06F 2221/2119
See application file for complete search history.

(56) References Cited

U.S. PATENT DOCUMENTS

| | | | | |
|---|---|---|---|---|
| 10,862,907 | B1* | 12/2020 | Pon | G06F 16/955 |
| 2012/0042381 | A1* | 2/2012 | Antonakakis | H04L 63/1483 |
| | | | | 726/22 |
| 2012/0158626 | A1* | 6/2012 | Zhu | G06F 21/56 |
| | | | | 726/22 |
| 2017/0026391 | A1* | 1/2017 | Abu-Nimeh | G06F 21/552 |
| 2017/0099314 | A1* | 4/2017 | Klatt | H04L 63/1483 |
| 2017/0279846 | A1 | 9/2017 | Osterweil et al. | |
| 2018/0097822 | A1* | 4/2018 | Huang | G06N 20/00 |
| 2018/0343272 | A1* | 11/2018 | Khalil | G06F 21/56 |
| 2019/0387024 | A1 | 12/2019 | Schulman et al. | |
| 2019/0394218 | A1 | 12/2019 | Pridgen | |
| 2021/0037006 | A1* | 2/2021 | Belenko | H04L 63/0823 |
| 2021/0203692 | A1* | 7/2021 | Nunes | G06N 5/046 |

OTHER PUBLICATIONS

D Huang, et al.; "Detecting phishing domains using Certificate Transparency" Facebook; May 2018; https://www.facebook.com/notes/protect-the-graph/detecting-phishing-domains-using-certificate-transparency/2037453483161459/; (7 pages).

Miike Cardwell; Detecting Phishing Sites Using Certificate Transparency Monitoring;; Apr. 2019; https://www.hardenize.com/blog/certificate-transparency-monitoring-phishing-detection; (7 pages).

* cited by examiner

PHISHING DOMAIN DETECTION SYSTEMS AND METHODS

PRIORITY CLAIM

The present application claims priority to and the benefit of U.S. Provisional Application 63/009,159, filed Apr. 13, 2020, the entirety of which is herein incorporated by reference.

BACKGROUND

The rise of phishing attacks continues to be a leading security concern for individuals and organizations. Previous research has examined content-based analysis, and network-based or URL-based approaches. In practice, existing defensive techniques rely mostly on published blacklists, reported and verified by users, or deployed by companies or organizations, including Google Safe Browsing, VirusTotal (VT), and the Anti Phishing Working Group (APWG). One key requirement for such blacklists is timeliness. That is, a domain must be added to the blacklists before it has affected many victims. Currently, however, a domain is added to blacklists only after it has become reachable and discovered by users during its campaign, which may be too late.

One new development in the cyber security space is the introduction of Certificate Transparency (CT) Logs. In order to defend against fraudulent TLS certificates and rogue Certificate Authorities (CA's), certificates are now published, by their issuing CA's, in public transparent append-only servers almost as soon as certificates are issued. As mentioned in the Chromium CT policy, since April 30th of 2018, Chrome, which is by far the most dominant browser in the world, has made it mandatory to have certificates in CT logs or risk showing a warning to browser users. Further, sub-resources served over HTTPS connections that are not CT-compliant will fail to load and will show an error in Chrome DevTools.

A digital certificate is trusted by a browser only if it has appeared in several special semi trusted append-only public certificate lists called certificate logs. When a browser-trusted certificate is sent to a log operator, it gets a Signed Certificate Timestamp (SCT). SCT is a signed promise to include the certificate into the list within specified time period called Maximum Merge Delay (MMD). Log Auditors verify that the log operators behave correctly, i.e., they include the submitted certificates in the correct order, append them within MMD, and do not try to insert, delete or change certificates in their logs retroactively. Log Monitors observe and verify that submitted certificates are legitimate, and correct. For instance, the task of a monitor is to discover if a CA has issued a fraudulent certificate (like the DigiNotart incident).

When a domain requests a certificate from a CA, the CA first creates a precertificate, and sends it to the CT log, which sends the corresponding SCT to the CA, as a promise of inclusion. Finally, the CA embeds the SCT as a X.509v3 extension and sends it to the client. This final certificate is known as the leaf certificate. Note that it is not mandatory for CA's to submit leaf certificates to CT logs (as precertificates suffice), but in many cases they are included. When both a precertificate and a leaf certificate for a domain appear in CT logs, they both have the same serial number.

Passive DNS (pDNS) captures traffic by cooperative deployment of sensors in various locations of the DNS hierarchy. For example, Farsight pDNS data utilizes sensors deployed behind DNS resolvers and provides aggregate information about domain resolutions. One advantage of pDNS is that it preserves the privacy of individual Internet users as it contains only aggregated information. However, such data is not as rich in information as proxy/HTTP DNS logs, which not only contain individual DNS queries and responses, but also timing information.

VirusTotal (VT) URL Feed is a service offered by Google® that provides a public querying facility to obtain intelligence on any URL by analyzing around 65-70 third-party scanners and URL/domain blacklisting services, including Google Safe Browsing (GSB), COMODO site inspector, phishtank and many others. Each tool in VT categorizes a URL as clean, malicious, phishing or malware. VT provides a rate limited public API to check the status of URLs programmatically. Additionally, every hour, VT publishes a feed of URLs along with aggregated intelligence for the URLs queried by Internet users all around the world during the previous hour. Previous research utilizes VT data to compile malicious ground truth for detecting or predicting malicious activities in the Internet. However, there are challenges related to the intelligence reported by VT. For example, GSB and phishtank results in VT are not always consistent with their direct results and different tools provide different labels such as phishing and malware for a given URL. A common practice is to obtain the intersection between multiple sources and also to use majority voting as the final VT label.

SUMMARY

The present disclosure provides new and innovative systems and methods for detecting phishing domains based on certificate transparency (CT) log data and other features, such as passive DNS (pDNS) and domain-based lexical features. The presently disclosed system combines aggregate and historical certificate features taken from CT logs to effectively identify recurring long-term phishing domains, and to combine CT and pDNS features to effectively mark new phishing domains. The provided system continuously downloads and stores all certificates appended to key CT logs. A trained classifier then identifies likely phishing domains in the CT logs without inspecting domain content. The classifier may be trained on (1) CT time-based features, (2) issuer-based features, (3) SAN-based features, (4) validation features, (5) pDNS-based features, and/or (6) lexical features. The inventors have run feature selection algorithms to identify the most important features for long-term and new domains.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

The present disclosure provides new and innovative systems and methods for detecting phishing domains based on certificate transparency (CT) log data and other features, such as passive DNS (pDNS) and domain-based lexical features. All indicators point to the fact that TLS adoption by domains will continue growing. Even phishing domains are forced to be CT-compliant in order to present victims with their pages and increase the effectiveness of their attacks. With emerging CA's providing free automated certificates, domain owners (phishing or benign) are increasingly incentivized to get on the TLS bandwagon. With these developments, many phishing domains may be observed in CT Logs.

Figure 1:
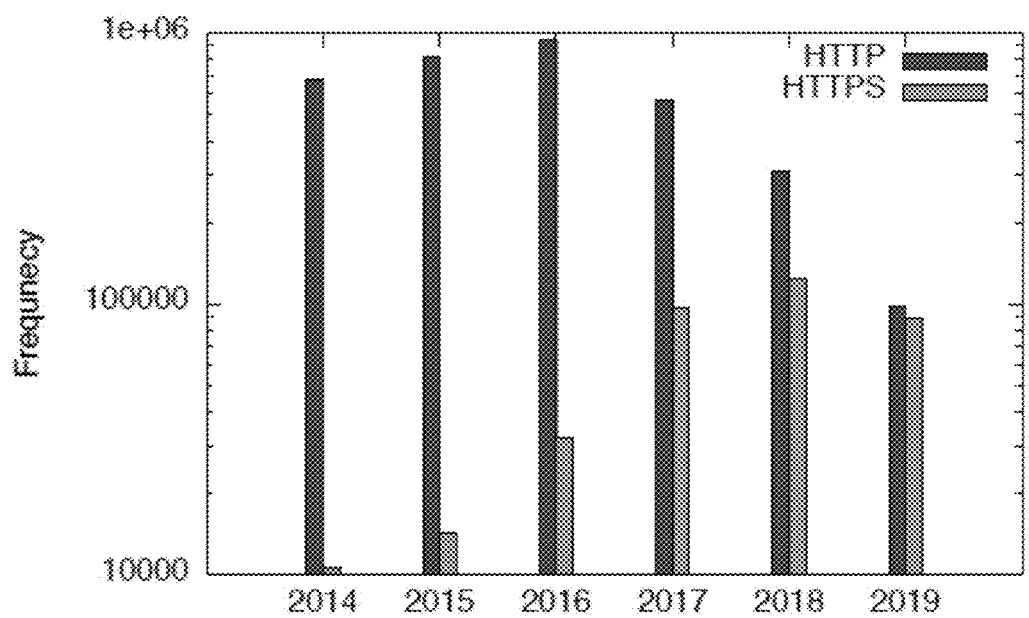
FIG. 1 illustrates a graph that compares the total number of HTTP and HTTPS reported instances in Phishtank's published list of verified phishing domains between 2014 and 2019.

It is also important for phishing domains to use TLS to look more legitimate to victims. Approximately, 49% of all phishing sites in the 3rd quarter of 2018 bore the padlock security icon indicating that they are using TLS. FIG. 1 illustrates a graph that compares the total number of HTTP and HTTPS reported instances in Phishtank's published list of verified phishing domains between 2014 and 2019. There is a significant increase in the utilization of TLS (green bars) until 2018. Over the years, the difference between the number of HTTP (red bars) and HTTPS domains (green bars) has been decreasing.

The presently disclosed system identifies long-term and new phishing domains early by monitoring CT logs. The provided system combines a CT certificate collection, management and lookup system in order to extract features efficiently for training a classifier and labelling domains. New and innovative CT- and pDNS-based features are identified and used to train a classifier to predict phishing domains without inspecting content. By detecting phishing domains earlier than conventional blacklists, the provided system can help prevent harm to potential victims of a phishing domain. The inventors have demonstrated that the presently disclosed system is able to identify phishing domains near real-time, days before they are identified by typical systems.

Figure 2:
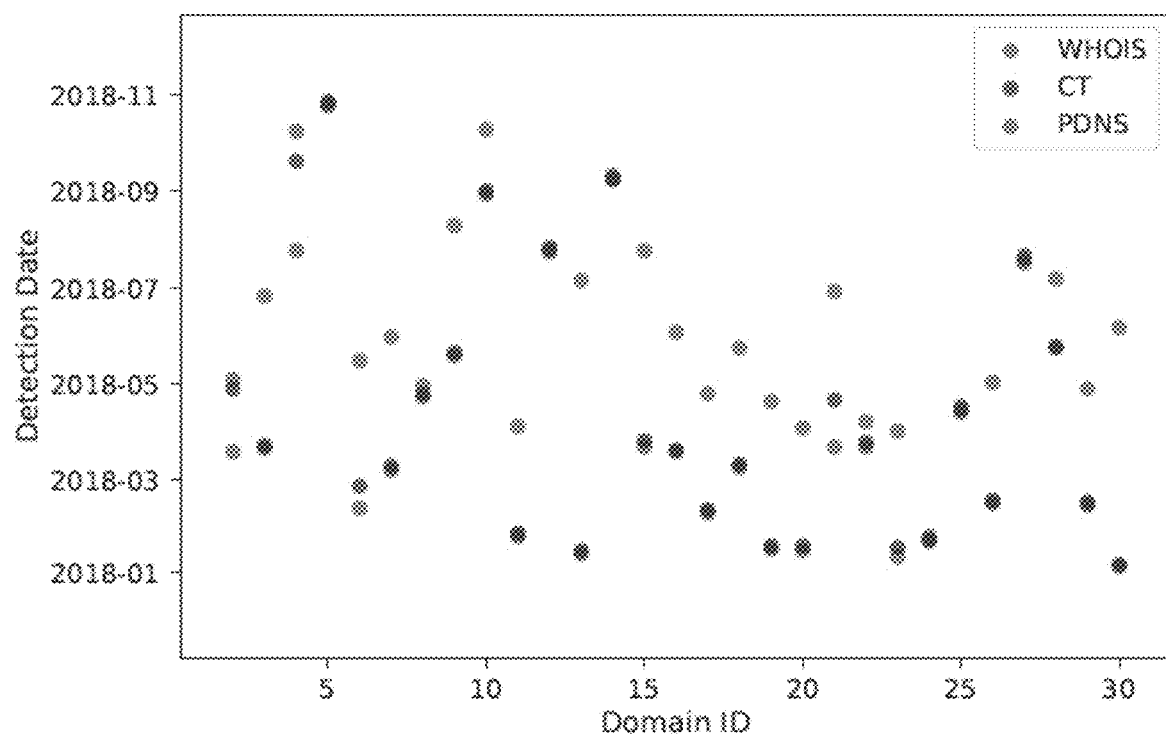
FIG. 2 illustrates a graph showing the times that 30 phishing domains appeared in Whois records, CT logs, and passive DNS in 2018.

The advantage of using CT as a source to detect phishing domains early is twofold. The first key advantage is improved detection latency. FIG. 2 illustrates a graph showing a scattered plot marking three event timestamps of a random sample of 301 phishing domains that appeared in 2018. The first event (in red) is the time that a domain is registered and appears in Whois records. Close to this Whois time point is the CT time point (blue point), at which a domain makes its appearance in CT logs. The green time point, for pDNS, represents the time each domain made its appearance in pDNS logs from Farsight Security which records DNS lookups performed by Internet users for each visible domain. In many cases, the gap between the CT time point and the pDNS time point can range between hours to days. The presently disclosed system detects phishing domains as soon as they appear in CT logs and before they are queried by users. By contrast, typical systems, as GSB, and VT may not mark domains as suspicious until the content is available.

Second, CT logs are a free and accessible data source that anyone can tap into and get an early peek of upcoming phishing domains (new, or old and revived). Other sources to identify phishing include DNS and domain registration data. While domain registration can also provide an earlier peak, in practice, it is increasingly difficult to acquire a complete set of registration data that can allow for early detection. Passive DNS is also a good source to monitor and identify phishing domains, but if a domain appears in DNS, it may indicate that the attack has already taken place. Some existing phishing detection tools rely on domain-based lexical features as phishing domains are known to use Domain Generation Algorithms (DGAs) and squatting techniques. The provided system outperforms lexical and squatting features.

Prior to the introduction of CT logs, the life cycle of phishing domains starts by domain registration. It is then delivered to victims during the targeted campaign period, until it is possibly taken down or blacklisted. With the pressing efforts towards TLS adoption, phishing domains appear in CT after they are registered and before the actual execution of phishing campaigns. The provided system identifies both long-term and new phishing domains by relying on CT-based and other available lexical- and pDNS-based features to catch those domains as soon as they appear on CT logs. Those domains comprise a suspicious list, which an organization can apply its policy to (e.g. warn users or block in extreme cases) until the page is online and starts having traffic, at which case content-based analysis approaches (e.g. Google Safe Browsing) can be used to determine if content is malicious.

Figure 3:
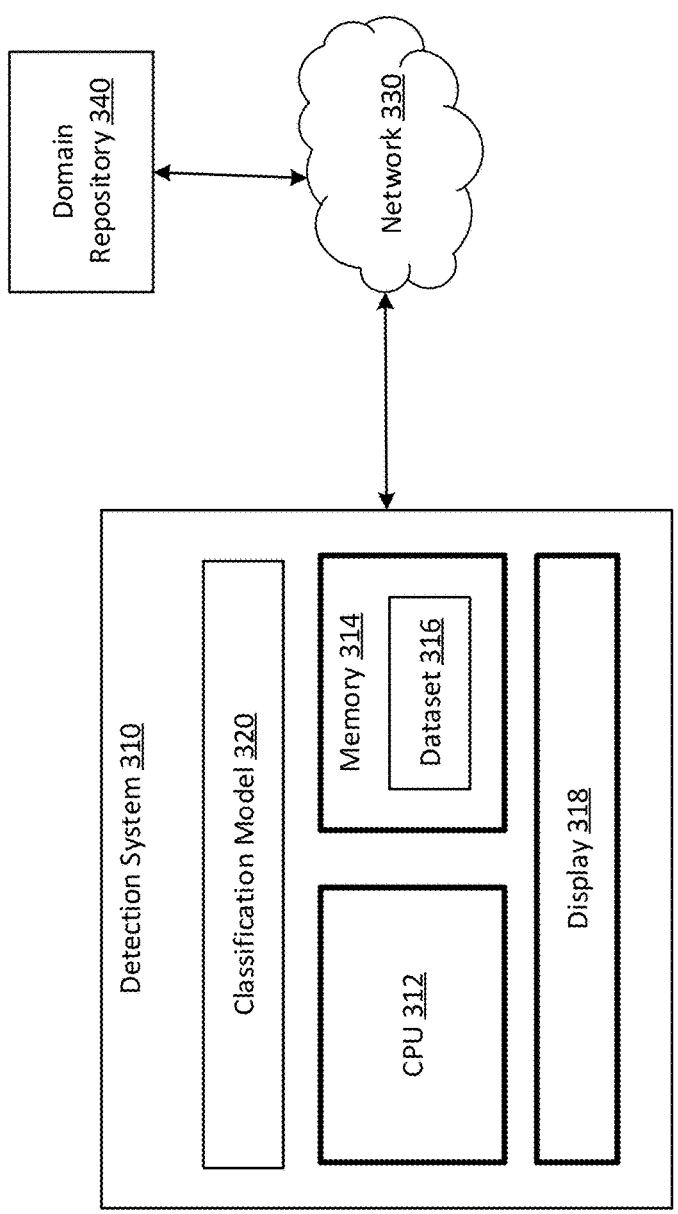
FIG. 3 illustrates a box diagram of an example system for detecting phishing domains, according to an aspect of the present disclosure.

FIG. 3 illustrates a box diagram of an example system 300 for detecting phishing domains. The example system 300 may include a detection system 310. The detection system 310 may be in communication with a domain repository 340 over a network 330. The network 330 can include, for example, the Internet or some other data network, including, but not limited to, any suitable wide area network or local area network. The detection system 310 may receive domain information for a set of domains from the domain repository 340 and generate a list of suspicious domains from the received set of domains. In at least some aspects, the domain repository 340 may be a suitable CT log, such as Google's Argon, CloudFlare's Nimbus, and DigiCert's Yeti logs. The domain information may include information maintained in any suitable CT log for a particular domain. For instance, the domain information for a domain may include certificate features included in a CT log, domain name (e.g., URL), pDNS information, and other suitable information.

The detection system 310 may include a processor in communication with a memory 314. The processor may be a CPU 312, an ASIC, or any other similar device. In various aspects, a dataset 316 may be stored in the memory 314. In some aspects, the dataset 316 includes the domain information for domains received from the domain repository 340. In at least some aspects, the dataset 316 includes data from all logs file referenced on the webpage of the CT project. This file lists all known logs, including the ones that store the outdated and test certificates. Outdated certificates can be helpful for the detection system 310 to get historical data. As such, in some aspects, data may be stored from all of these logs in the dataset 316. However, to reduce the amount of the data in the future and make it more manageable, in some examples, only the logs that are trusted by the Google Chrome browser are used.

In at least some aspects, the detection system 310 may include a software application implemented by the CPU 312 for collecting, parsing and processing the data from the domain repository 340 (e.g., CT logs). In one example, such a software application is based on a modified version of the CaliDog's CertStream-Python application. It is modified in this example in that, first, the possibility is added to query all the data from a log, not only the most recent ones. Second, the parser is enriched in order to extract additional information from a certificate (e.g. certificate validation type). The functionality is also added to store the collected data in the dataset 316 stored in the memory 314, so that there is the capability to query historical data.

In only some aspects, the detection system 310 may include a software application implemented by the CPU 312 for storing, indexing and effectively querying data in the dataset 316. For example, the detection system 310 may include Elasticsearch, an open-source distributed, full text-search-enabled analytics and data storage engine. The usage of this system provides several benefits. First, due to its elasticity it allows storing, indexing and effectively querying large amounts of data. An elastic cluster with 25 servers is set up. All data in Elasticsearch is stored in indices. The dataset is divided by years and months, and indices are created each of which represents each month data. This design allows for a quick response time by querying several indices in parallel while the workload is distributed to multiple servers. Table 1 shows the response time for up to 10K Alexa domains.

TABLE 1

| Category | # Domains | Response Time(ms) |
|---|---|---|
| Alexa | 1 | 1480.8 |
|  | 10 | 5355.9 |
|  | 100 | 7678.8 |
|  | 1000 | 8093.1 |
|  | 10000 | 9017.5 |

In at least some aspects, the detection system 310 may include a classification model 320 trained to generate classification prediction scores of a likelihood that a domain is a phishing domain. For example, the dataset 316 may be populated with domains that are known to be phishing domains and domains that are known to be benign and the classification model 320 may be trained based on this domain data. The training helps the classification model 322 predict a likelihood (e.g., a classification prediction score) that a new, unknown domain is a phishing domain. In at least some aspects, a predetermined likelihood threshold (e.g., 50%, 60%, 70%, 75%, etc.) may be set and only domains with a classification prediction score that meets the predetermined threshold are determined to be phishing domains.

The classification model 320 may be implemented by one or more machine learning models including one or more supervised learning models, unsupervised learning models, or other types of machine learning models. In various aspects, the classification model 320 may be trained by a machine learning algorithm. For example, the machine learning algorithm may be Random Forests (RF), Long Short Term Memory (LSTM), Gated Recurrent Unit (GRU), Convolutional Neural Network (CNN), MultiLayer Perceptron (MLP), XGboost, decision trees, Support Vector Machine (SVM), or other suitable machine learning algorithm.

The classification model 320 is trained on a novel combination of aggregate and historical certificate features take from CT logs to effectively identify recurring long-term phishing domains. The classification model 320 is also trained on a novel combination of CT and pDNS features to effectively mark new phishing domains.

In some aspects, the detection system 310 may include a display 318. The display 318 may be any suitable display for displaying information. In some examples, the components of the detection system 310 may be combined, rearranged, removed, or provided on a separate device or server.

To differentiate between suspicious (e.g., likely phishing) and benign domains in terms of their CT log fingerprints, distinguishing patterns between phishing and benign domains were found by closely inspecting their respective CT log traces through experiments. Using the detection system 310, the inventors collected all existing CT log information (all logged certificates) for three datasets of domains: Alexa, phishing, and benign.

Figures 4A, 4B, 4C:
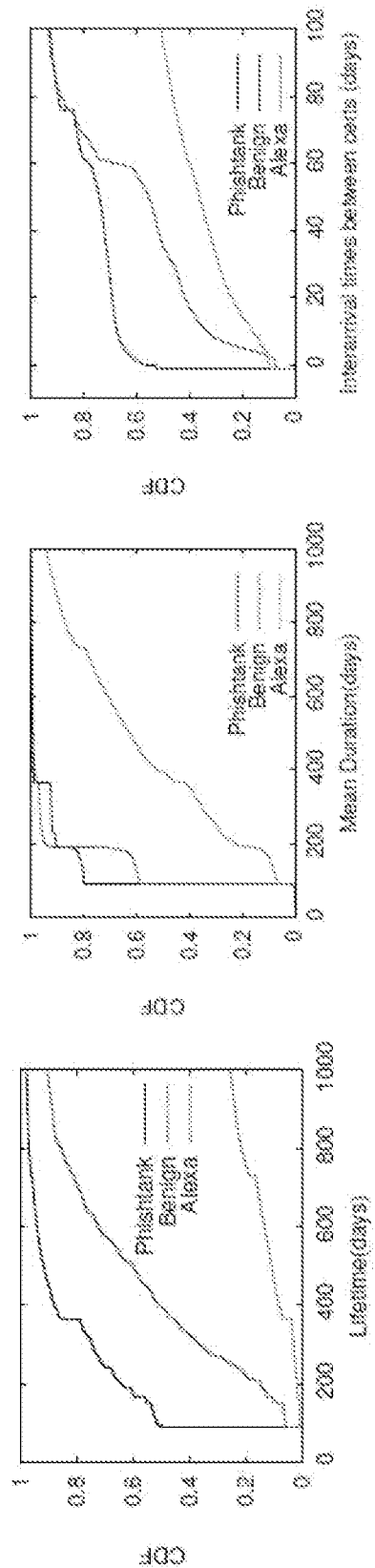
FIGS. 4A, 4B, and 4C illustrate graphs showing the distribution of the lifetime in days of three domains as they appear in CT logs, the mean duration of each certificate in days of the three domains, and the inter-arrival times between certificates in days of the three domains, respectively.

FIG. 4A illustrates a graph showing the distribution of the lifetime in days of each domain as it appears in CT logs. The lifetime is the difference between the expiration date of the last certificate and the issuance date of the first certificate. When a domain has only one certificate, the lifetime becomes the difference between the expiry date and the issuance date of that certificate.

Alexa domains have the longest lifetime with 80% of domains exceeding 800 days. Benign and phishing have also clearly different distributions. At the median, the benign domains have a lifetime of 400 days, whereas phishing domains have a lifetime of 90 days. Clearly, this certificate lifetime is different from the active phishing campaign lifetime. It has been shown before that the active lifetime of the majority of phishing domains does not exceed a few days. However, some phishing domains have a longer time span over multiple years.

Each certificate has a different validity period. FIG. 4B illustrates a graph depicting the distribution of the mean validity period of the domains in our datasets. Since the domains in Alexa are run by well-established organizations, it is expected that those companies pay for long-term premium certificates, since paid options are recommended for e-commerce due to their longer validity, enhanced validation options, and customer support. One can observe that the mean duration is over one year at the median, and more than a year for 50% of the domains. On the other hand, almost 80% and 60% of phishing and benign domains, respectively, have a validity period of 90 days. Note that some CA's, such as Let's Encrypt and COMODO provide free certificate options which have a duration of three months. In some rare cases, some phishing domains have valid certificates for several years. For example, the phishing domain cjoint.net, which gets redirected to lfichier.com, has a valid certificate for 5 years. On a close inspection, it can be seen that this domain provides a file sharing service to host any type of files. While on the surface the domain may appear as benign to a content-based analyzer such as Google safe browsing, by the association with many phishing pages and malicious content, one can conclude that the domain is not safe.

FIG. 4C illustrates a graph depicting the distribution of the mean inter-arrival times between certificates of each domain. This is the time gap between the issue dates of every two consecutive certificates of a domain. Approximately, 53% of phishing domains have only single certificates (value −1 in the CDF). The remaining 47% phishing domains have significantly smaller inter-arrival times than benign and Alexa domains. This observation is consistent with certificate validity period mentioned above.

The inventors inspected phishing domains in particular to find out if some domains have "uncertified" periods during their lifetime. In other words, for domains that have more than one certificate $C_1, C_2, \ldots, C_n$, the inventors checked if the issue date of $C_i$ is greater than the expiry date of $C_{i-1}$. The inventors found approximately 2000 domains (almost 15% of the total phishing dataset) that had such uncertified periods of time with a mean gap duration of 114 days (and 115 days standard deviation). When inspected manually, some of these domains appear to be squatting domains which contained substrings like "paypal", "netflix", etc. This could be an indication of phishing domain reuse or revival, possibly after a takedown operation, either by the same operators or not. An example for such domains is official-giveaway.org which had a gap between end of 2015 and mid-2018. This observation is consistent with previous studies of domain drop-catching suggesting that malicious domains are more likely to be caught after they are dropped. To address this observation, the detection model 310 is trained with uncertified gaps as a feature.

Figure 5:
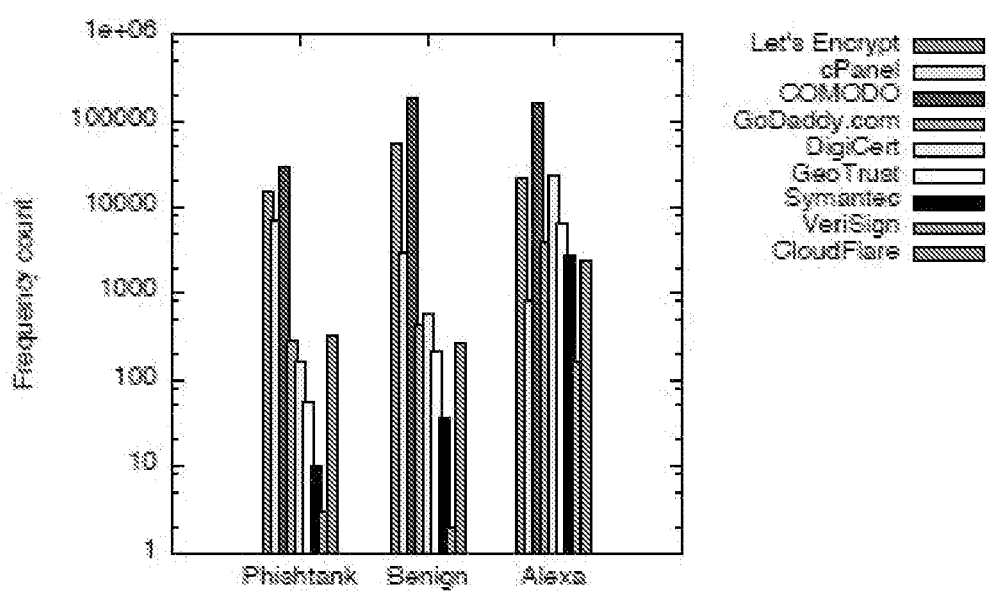
FIG. 5 illustrates a graph showing a frequency count of the most common certificate authorities in log scale.

FIG. 5 illustrates a graph showing the frequency count of the most common CAs (in log scale). The top three Organizations in all datasets belong to COMODO, Let's Encrypt and cPanel. With the high frequency of those three organizations in all datasets, one would expect that inspecting organizations alone to make phishing predictions may yield little information. Further, while some organizations such as DigiCert and GeoTrust are used significantly more in Alexa domains (22K certificates) compared to benign or phishing domains (571 and 157 certificates, respectively), the dominance of the top three makes such differences insignificant. Hence, looking at the organizations used alone is insufficient to distinguish between phishing and benign domains. There is a need for more indicative features as well.

Figure 6:
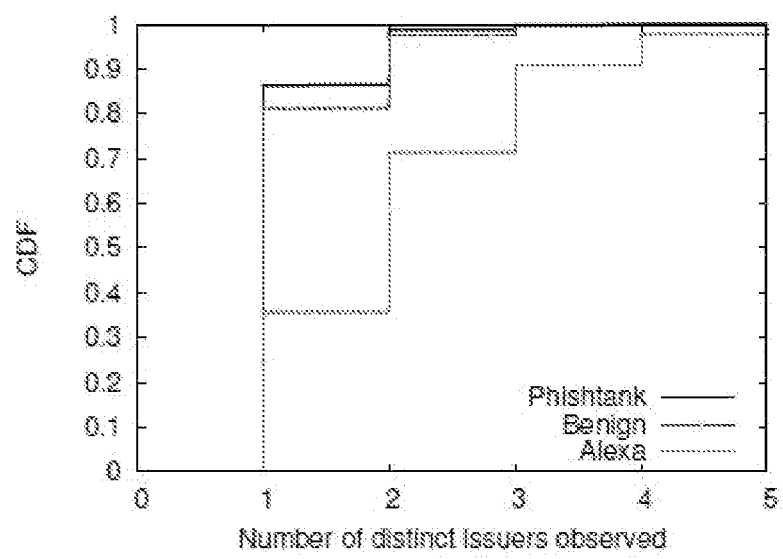
FIG. 6 illustrates a graph showing a distribution of the number of distinct organizations used for the three datasets of the present disclosure.

FIG. 6 illustrates a graph showing the distribution of the number of distinct organizations used for the three datasets. Both phishing and benign domains follow a similar pattern where approximately 80% of domains utilize one organization during their lifetime, whereas Alexa domains use slightly more (2 organizations at the median and 3 at the 80th percentile). This observation is consistent with the observation of domain duration. Phishing and benign domains are more likely to have a relatively shorter time period compared Alexa domains, and hence, they do not have many certificates.

The inventors also checked if certain pairs of organizations occur more frequently together in certain datasets. In general, it was observed that utilizing cPanel and Let's Encrypt together by one domain is more frequent for phishing domains with a count of 575 compared to 184 in benign domain. This pair is not common in Alexa domains (as cPanel is not common in top Alexa domains in general). As such, the issuer alone is insufficient to decide if the domain is suspicious. Contrary to popular belief, the domain association with Let's Encrypt doesn't necessarily mean malicious use. However, for long-term domains, the set of all used issuers is a highly ranked feature.

Figure 7:
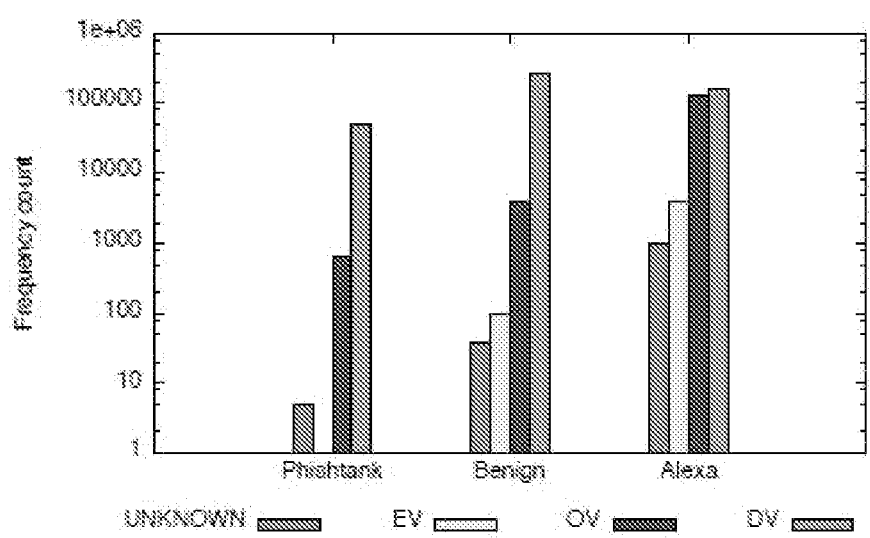
FIG. 7 illustrates a graph comparing the frequency count (in log scale) of the validation code of all certificates belonging to the domains in the datasets of the present disclosure.

Certificate validation is a conventional feature to identify phishing certificates. The rationale is that benign domains opt for higher validation, while phishing domains tend to reduce their costs by using lower validation options. Each certificate has a validation option that is performed by the CA. FIG. 7 illustrates a graph comparing the frequency count (in log scale) of the validation code of all the certificates belonging to the domains in the three datasets. DV is clearly the most common form of validation, as it comes by default with basic and even free certificates. However, OV and EV are significantly more common in Alexa domains. As for benign domains, there are more OV certificates compared to phishing domains, which did not have any certificate in the EV category. However, nearly 650 phishing certificates have OV validation (related to 340 domains). This was only 1.3% of the total certificates issued for domains in the phishing dataset used by the inventors.

Figures 8A, 8B, 8C:
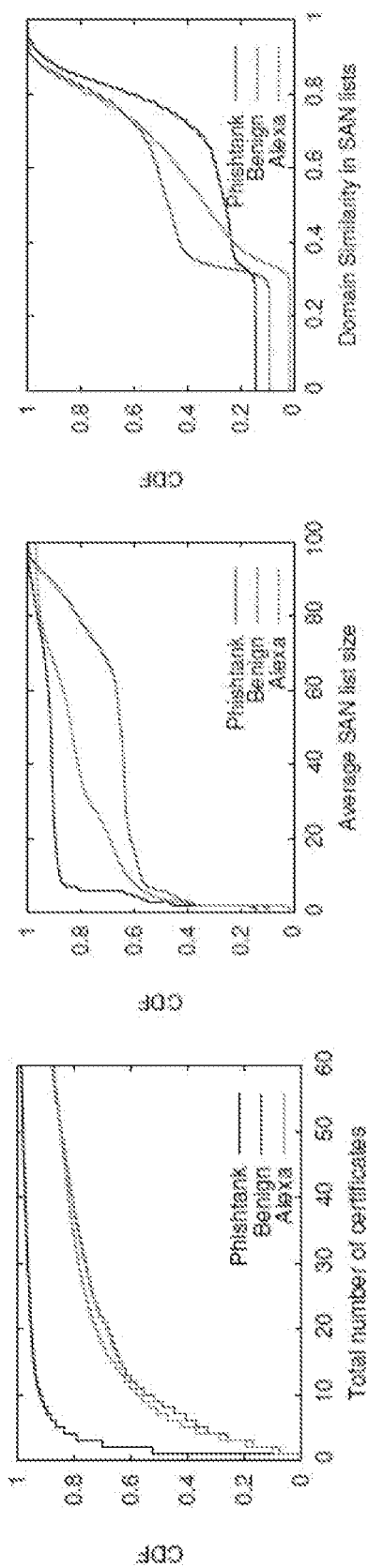
FIGS. 8A, 8B, and 8C illustrate graphs showing the distributions of the total number of certificates obtained by the domains in the datasets of the present disclosure, the distributions of the mean SAN list size for the datasets, and the distributions of the domain similarity in the SAN lists of the different datasets, respectively.

FIG. 8A illustrates a graph showing the distributions of the total number of certificates obtained by the domains in the three datasets. Alexa and benign domains follow a similar trend where 50% of the domains obtained no more than 10 certificates, and 30% obtained between 10 and 50 certificates. On the other hand, 50% of phishing domains obtain only one certificate. Also, 40% of phishing domains obtain between two and nine certificates. The distribution also exhibits a long tail where a very small fraction of domains own tens of certificates. The reason why domains obtain such an unexpected number of certificates may be because some domain owners possibly rely on scripts to automate the process of obtaining certificates, which could be misconfigured. Another reason may be because some Content Delivery Networks (CDNs) use one certificate to support multiple domains by using the Subject Alternative Names (SAN) certificate extension. Those are also known as cruise certificates. It was observed that the frequency of certificate updates (thereby the total number of certificates) increases with such use of multi-domain (SAN) certificates.

FIG. 8B illustrates a graph showing the distributions of the mean SAN list size for the datasets. Approximately, 3%, 9% and 14% of Alexa, benign, and phishing domain certificates, respectively, did not include a SAN field. Overall, phishing domains have a significantly smaller SAN list size, which is less than or equal to 10 domains for 88% of the domains. The SAN list size ranges between 20 to over 200 domains for 40% of the domains. The distribution of Alexa domains sits in the middle between benign and phishing domains. The reason for the large SAN list size for some phishing and benign domains may be the reliance on CDNs which generate the multi-domain certificates.

When a CDN issues a multi-domain certificate, the SAN field usually contains arbitrarily unrelated domains. For example, one of the certificates for the domain mainlinehometeam.com has a large SAN list which includes unrelated domains like alabamacoastliving.org and mariottrealestate.com. Domains like cnn.com have more related domains money.cnn.com, and moneystream.cnn.com, which are controlled by the same apex domain cnn.com. Based on this observation, it can be expected that the domains in the second SAN list have a higher similarity compared to the first SAN list. The inventors computed the similarity, the edit distance normalized by the length of the longest domain, between every two pairs of domains, after removing the Top Level Domain (TLD), in the SAN lists obtained from the certificates in the inventors' datasets.

FIG. 8C illustrates the distributions of the domain similarity in the SAN lists of the different datasets. Phishing domains showed more similarity than benign domains. The reason is that phishing domains in general showed significantly shorter SAN list sizes. Further, many benign domains appear in the SAN list of other unrelated domains as in the multi-domain certificates mentioned above. This results in low similarity for the SAN lists for benign domains.

The inventors also examined common lexical-based features, which utilize the domain name string, to derive features that can identify phishing domains. Such features include the domain name entropy, domain length, number of special characters or digits, and squatting-based features. Randomized domain names generated by algorithms (e.g. DGAs) can possibly be indicative of maliciousness purposes. Relative entropy is a conventional measure of randomness in domain names. To compute the relative entropy, the character entropy may be computed based on Alexa top 10K domains. The idea is that characters in domain names should not be equally probable, but should follow Alexa top domains in terms of character probabilities as a baseline.

Figure 9:
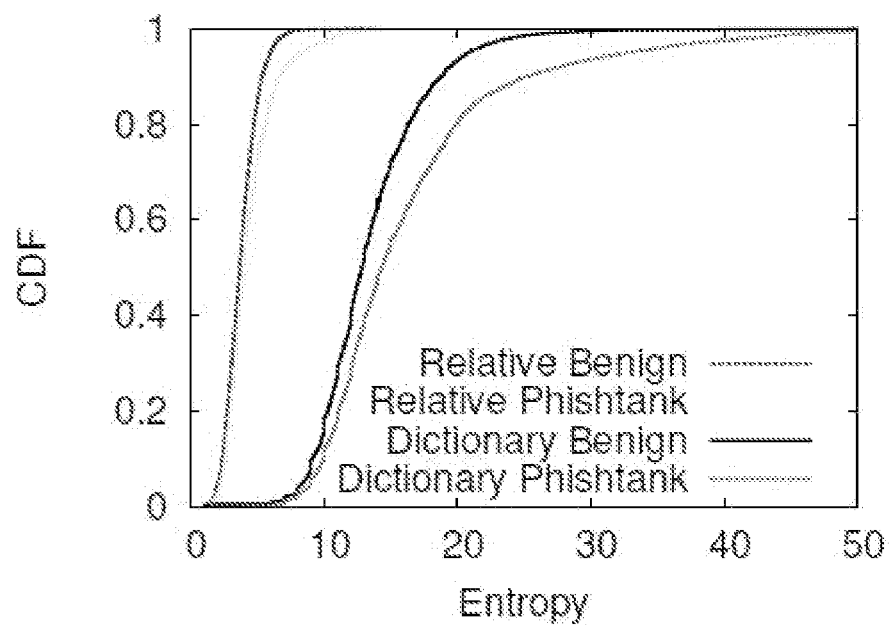
FIG. 9 illustrates a graph that compares the entropy results for both approaches for the benign and phishing datasets of the present disclosure.

A dictionary-based entropy was computed, where in each domain name, base words are matched against English dictionary words, or patterns. The entropy is then calculated based on non-overlapping matches. FIG. 9 illustrates a graph that compares the entropy results for both approaches for the benign and phishing datasets of the present disclosure. In both cases, phishing domains show higher entropy values. While the dictionary-based approach produces more distinguishable entropy distributions between benign and phishing domains compared to the relative entropy approach, it is not sufficient by itself as phishing domains attempt to look more legitimate.

Figure 10:
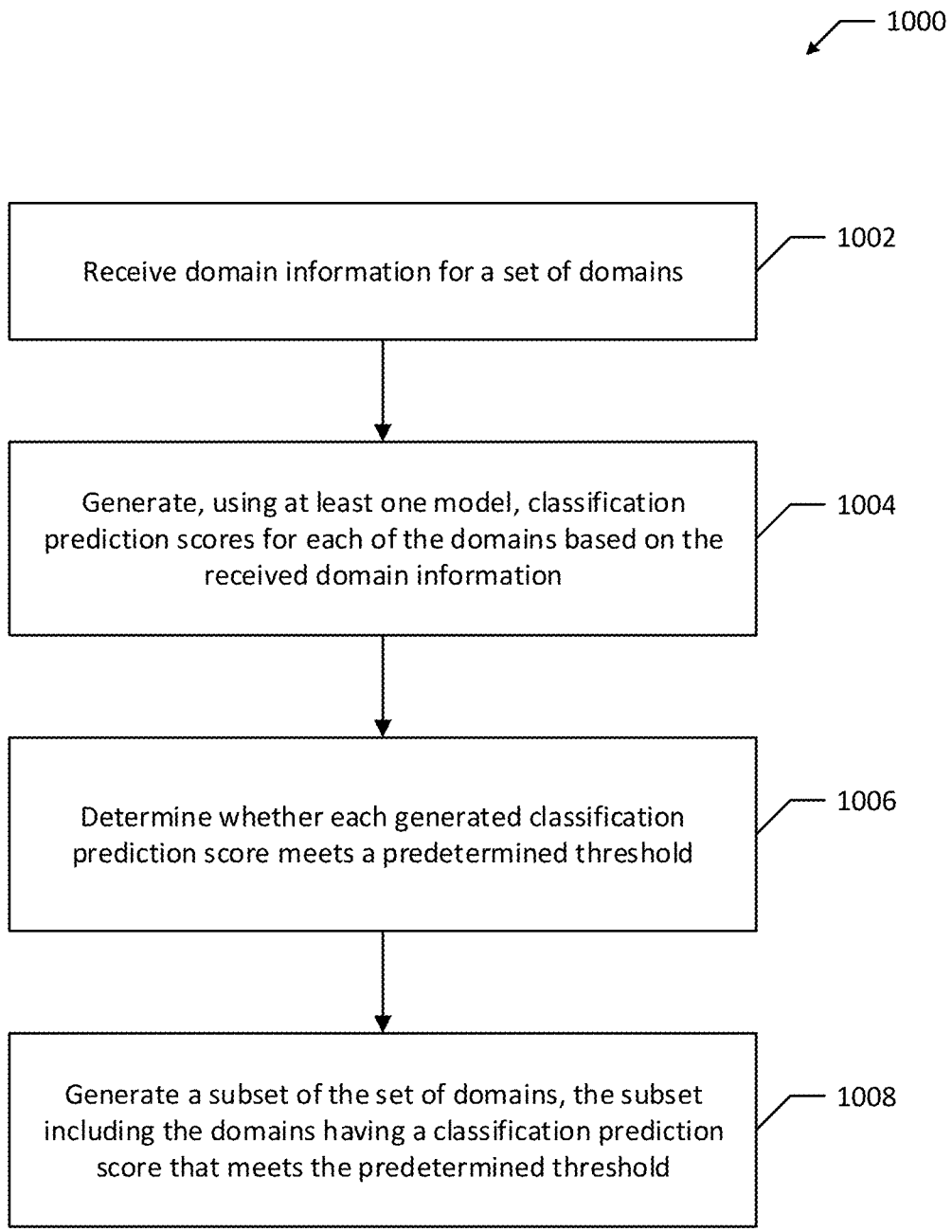
FIG. 10 illustrates a flow chart of a method for detecting phishing domains, according to an aspect of the present disclosure

FIG. 10 illustrates a flow chart of an example method 1000 for detecting phishing domains. Although the example method 1000 is described with reference to the flowchart illustrated in FIG. 10, it will be appreciated that many other methods of performing the acts associated with the method 1000 may be used. For example, the order of some of the blocks may be changed, certain blocks may be combined with other blocks, and some of the blocks described are optional. The method 1000 may be performed by processing logic that may comprise hardware (circuitry, dedicated logic, etc.), software, or a combination of both. For example, the processor of the detection system 310 may be configured to perform the method 1000.

In at least some aspects, the method 1000 includes receiving domain information for a set of domains (block 1002). For example, the detection system 310 may receive domain information from the domain repository 340. The detection system 310 may issue a request to the domain repository 342 get domains added during the last epoch. As described above, the domain repository 342 may be a CT log.

Based on the received domain information, classification prediction scores may be generated for each of the domains using at least one model (block 1004). For example, the detection system 310 may generate classification prediction scores for each of the domains using the classification model 320. A classification prediction score is a likelihood that a domain is a phishing domain. In at least some aspects, various features may be extracted from received domain information for generating the classification prediction scores, the extracted features being the features that the classification model 320 is trained on. For instance, the detection system 310 may extract CT-based features. The system may also get features from other sources such as pDNS and lexical analysis. Filtering of recently classified domains may be done to reduce workload.

In various instances, the classification model 320 may be trained on at least some of the following features that the inventors have found best distinguish phishing domains. Statistics based on the CT-log domain are used including the (1) lifetime; (2) mean, max, and min inter-arrival times between certs of a domain; (3) mean, max, and min certificate duration (validity) times; and (4) number and duration of uncertified gaps. As the inventors have observed, phishing domains have significantly lower CT lifetime and certificate duration, and inter-arrival times, and generally larger uncertified periods. Note that time-based features also work for completely new domains with no prior history. For example, a new domain whose certificate has a 90 day validity window (CT lifetime) would be more suspicious than other older domains.

Issuer-based features combine numerical features including (1) the number of distinct issuers used (based on the "O" field), and (2) the size of the list of all issuers (total number of certs acquired by a domain). Issuer lists are also extracted for each domain based on the "CN" field. SAN-based features include computing the average length of all SAN lists associated with a domain (from all its certificates). SAN list length can distinguish between benign and phishing domains. Using the similarity of SAN lists is avoided because for large lists, computing similarity is computationally intensive. However, the SAN matches are computed, which is the number of second-level domain matches between a domain and the domains in its certificate's SAN list.

Validation features include distinguishing validation options observed for each domain during its lifetime. Although DV is common for all domain types, EV is more common in Alexa and benign domains. Distinguishing pDNS-based features include: (1) number of DNS queries, which is the number of resolutions recorded for each domain under consideration, (2) pDNS lifetime, which is the difference between the last time last and the time first a domain was seen in the pDNS traces, (3) number of name servers where the domain had authoritative DNS records, and (4) number of administrative servers related to the domain. The last two features capture domains that are either likely to be re-registered or hosted on multiple hosting providers over its lifespan. It was observed that pDNS lifetime is longer for phishing domains compared to benign and Alexa domains. The number of aggregate DNS queries, and the pDNS lifetime, which is roughly equivalent to domain lifetime, have been proposed as features in previous research to distinguish malicious domains. However, the time difference between pDNS and CT first appearances and the count of name and administrative servers are new and innovative.

Lexical features include, for each domain name, computing the dictionary entropy, and extract the number of digits, dashes, and total characters. The suspicious token and brand lists of available tools may also be used to keep a count of suspicious tokens that may indicate squatting.

It may then be determined whether each of the generated classification prediction scores meets a predetermined threshold (block 1006). For example, the detection system 310 may compare each of the generated classification prediction scores with a predetermined threshold value. The predetermined threshold is a particular likelihood of a domain being a phishing domain, such as 50%, 65%, 80%, etc. For instance, a predetermined threshold may be set based on a desired false positive rate. The lower the predetermined threshold, the more likely it is that a benign domain may be classified as a phishing domain (e.g., since the predicted likelihood is lower), but the more likely it is that all phishing domains will be classified as phishing domains.

A subset of the set of domains may then be generated including the domains having a classification prediction score that meets the predetermined threshold (block 1008). For example, the detection system 310 may generate a subset (e.g., list) of the domains with a classification prediction score that meets the predetermined threshold. The domains on the generated list are the domains that are determined to be, or are likely be, phishing domains. In only some aspects, the generated list may be displayed. For example, the detection system 310 may display the generated list on the display 318. Organizations may apply various policies based on the list, for example, temporarily warn users against accessing the domains on the list (or block the domains) until further evidence is available.

As described above, an advantage of the detection system 310 is that is enables detection of phishing domains earlier than typical systems. As such, the generated list may be generated prior to certain information of a domain becoming available. In various aspects, as time passes and additional information (e.g., page content of the domain) pertaining to a domain becomes available, the generated list can be refined to generate a final blocked list. For example, the page content of a domain may indicate that the domain is more likely or less likely to be a phishing domain than the classification prediction score generated by the classification model 320. In at least some aspects, the refined generated list and a list of benign domains may used to retrain the classification model 320 periodically.

Experimental Validation

To evaluate the presently disclosed system, the inventors compiled benign and phishing datasets. The clean dataset contained 10,000 benign domains, including 2,000 new domains that had only one entry (certificate) in CT logs. The phishing dataset contained 9,000 phishing domains that appeared as "online" and "verified" in Phishtank, including 3,000 new domains (e.g., only one entry in CT logs) and 6,000 long-term domains that had more than one certificate entry in CT logs. The inventors experimented with both balanced and imbalanced datasets. In the balanced datasets, the inventors used the all the samples of the phishing and clean datasets described above. For the imbalanced datasets, the inventors used the complete clean dataset, but only 20% of the phishing dataset.

Figure 11:
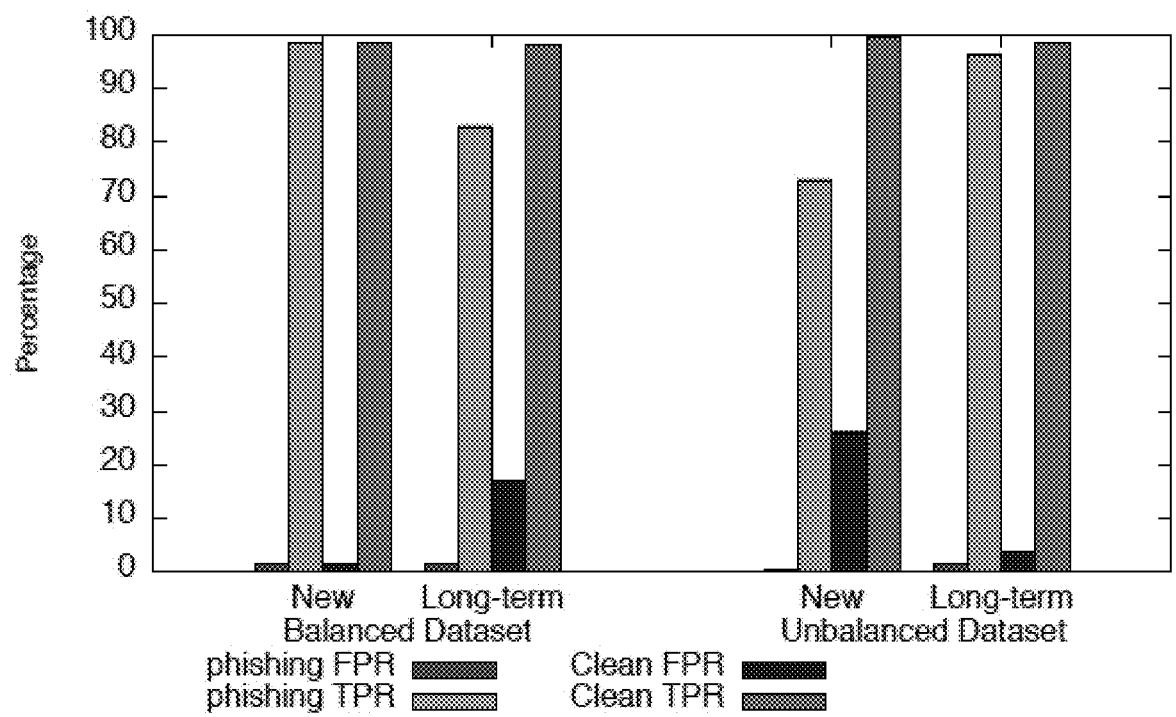
FIG. 11 illustrates a graph showing the presently disclosed results for new and long-term domains.

FIG. 11 illustrates a graph showing the false positive rate (FPR) and true positive rate (TPR) for new and long-term domains of both phishing and clean domains. For new domains, as shown, the FPR for phishing, and clean domains is 1.6%, and 1.4%, respectively. The TPR is also high and exceeding 98% for both datasets. With such high TPR, an organization can tune and trade-off between FPR and TPR according to its requirements. For example, with a very low FPR of 0.7%, the TPR still remains 80%. On the other hand, when we train the classifier with the imbalanced dataset, the phishing FPR drops to 0.5% with also a lower TPR of 73%. This shows that the classification model 320 effectively distinguishes phishing domains even when trained with imbalanced datasets.

Table 2 below summarizes the ranking of features based on information gain feature selection algorithm used with Random Forests. The highest feature is the SAN matches. Next, pDNS features rank highest followed by the certificate issuer and lexical features. The inventors inspected the instances causing the false positives, and the main reason for the misclassification is missing attributes (e.g. pDNS-related attributes are missing for the domain).

TABLE 2

| Score | Feature |
|---|---|
| 0.40 | SAN Matches |
| 0.2-0.1 | pDNS-based |
| 0.2 | Certificate Validation and Lifetime |
| 0.1 | Certificate Issuer |
| 0.09-0.04 | Lexical-based |

For long-term domains, as shown, the FPR of phishing is 1.6% and its TPR is 83%. Again, one can trade off between FPR and TPR to achieve a lower FPR. For example, with a very low FPR of 0.8%, the TPR still remains high at 77.6%. With imbalanced datasets, the phishing FPR drops slightly to 1.5%, but the TPR improves significantly to 96.3%.

Overall, the classification accuracy is higher for new domains, compared to long-term domains. One possible explanation is that long-term phishing domains start to look more benign the longer they live as they tend to have more certificates and longer lifetime. Further, pDNS features such as the number of authoritative name servers and domain life span as observed from pDNS data, become insignificant as previous registrations of a given domain may have been utilized for benign purposes and the pDNS features for long-term phishing domains become tainted with benign behaviors.

Indeed, this is depicted in the feature importance of long-term domains summarized in Table 3 below. The highest ranked feature is the list of all issuers used by the domain over its lifetime. This is followed by other CT-based features (e.g. certificate interarrival times, duration, duration of uncertified gaps, and the SAN list size stats) including the pDNS and CT time gap. Next, pure pDNS-related features are ranked between 0.1-0.04. Lexical-based features were at the bottom of the ranked features (less than 0.02).

TABLE 3

| Score | Feature |
|---|---|
| 0.40 | Set of Issuers for a domain |
| 0.2-0.1 | CT-based (including pDNS-CT gap) |
| 0.1-0.04 | pDNS-based |
| 0.02-0.0006 | Lexical-based |

It can be noted that in both categories of domains, lexical-based features obtained the lowest ranks of feature importance. We believe the reason is that squatting generally does not comprise the majority of phishing domains, as we have observed in our dataset. As stated above, a small fraction of phishing domains uses squatting (no more than 4%) in the sample data. The subset of squatting is still important to detect, however, and thus the lexical-based features can still be useful.

Table 4 below shows the impact of the different categories of features on phishing FPR. When pDNS features are used on their own, 17% and 27% FPR were achieved for new and long-term domains, respectively. On the other hand, when CT-based features were used alone, the FPR for long-term domains is only 3.8%, but for new domains, it is 20%. The reason is that for new domains, there are significantly less features that can be calculated from CT compared to long-term domains. The best results were obtained when both pDNS and CT features were both combined, though this does not limit the use of the other combinations in the detection system 310.

TABLE 4

| Feature Category | New domains | Long-term domains |
| --- | --- | --- |
| Lexical | 37.9% | 28% |
| pDNS | 17% | 27% |
| CT | 20% | 3.8% |
| pDNS + CT | 1.6% | 1.7% |

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follow:

1. A system for detecting phishing domains, the system comprising:
   a memory; and
   a processor in communication with the memory, the processor configured to:
   receive domain information maintained in a certificate transparency (CT) log for a set of domains;
   generate, using at least one model, classification prediction scores for each of the domains based on the received domain information, wherein a classification prediction score is a likelihood that a domain is a phishing domain;
   determine whether each generated classification prediction score meets a predetermined threshold; and
   generate a subset of the set of domains, the subset including the domains having a classification prediction score that meets the predetermined threshold, and wherein the domains in the subset are classified as phishing domains,
   wherein the at least one model is trained on CT log-based features, the CT log-based features comprising at least one of a quantity of uncertified gaps of a domain and a duration of time of the uncertified gaps of a domain,
   wherein domain information for the set of domains is further received from a passive DNS (pDNS) system, wherein the at least one model is trained on pDNS-based features including both of a quantity of name servers, where a domain had authoritative domain name system (DNS) records, and a quantity of administrative servers related to a domain,
   wherein the at least one model is trained on lexical features including a quantity of digits, dashes, and total characters of a dictionary entropy of a domain name.

2. The system for detecting phishing domains of claim 1, wherein historical domain data including domains determined to be phishing domains and domains determined to be benign domains is stored in the memory.

3. The system for detecting phishing domains of claim 2, wherein the at least one model is trained based on the stored historical domain data.

4. The system for detecting phishing domains of claim 1, wherein the CT log-based features further comprises at least one of a lifetime of a domain, a mean, maximum, or minimum inter-arrival time between certificates of a domain, a mean, maximum, or minimum certificate duration of a domain, a quantity of distinct certificate issuers of a domain, a total quantity of certificates acquired by a domain, and an average length of all subject alternative name (SAN) lists associated with a domain.

5. The system for detecting phishing domains of claim 1, wherein the CT log-based features further comprises each of a lifetime of a domain, a mean, maximum, or minimum inter-arrival time between certificates of a domain, a mean, maximum, or minimum certificate duration of a domain, a quantity of distinct certificate issuers of a domain, a total quantity of certificates acquired by a domain, and an average length of all subject alternative name (SAN) lists associated with a domain.

6. The system for detecting phishing domains of claim 1, wherein the at least one model is trained on each of a lifetime of a domain, a mean, maximum, or minimum inter-arrival time between certificates of a domain, a mean, maximum, or minimum certificate duration of a domain, a quantity of distinct certificate issuers of a domain, a total quantity of certificates acquired by a domain, and an average length of all subject alternative name (SAN) lists associated with a domain.

7. The system for detecting phishing domains of claim 1, wherein the at least one model is trained by one or more machine learning algorithms in a group consisting of Random Forests (RF), Long Short Term Memory (LSTM), Gated Recurrent Unit (GRU), Convolutional Neural Network (CNN), MultiLayer Perceptron (MLP), XGboost, decision trees, and Support Vector Machine (SVM).

8. The system for detecting phishing domains of claim 1, wherein the predetermined threshold is set based on a desired false positive rate.

9. A method for detecting phishing domains comprising:
   receiving domain information from a certificate transparency (CT) log for a set of domains;
   generating, using at least one model, classification prediction scores for each of the domains based on the received domain information, wherein a classification prediction score is a likelihood that a domain is a phishing domain;
   determining whether each generated classification prediction score meets a predetermined threshold; and
   generating a subset of the set of domains, the subset including the domains having a classification prediction score that meets the predetermined threshold, and wherein the domains in the subset are classified as phishing domains,
   wherein the at least one model is trained on CT log-based features, the CT log-based features comprising at least one of a quantity of uncertified gaps of a domain and a duration of time of the uncertified gaps of a domain,
wherein domain information for the set of domains is further received from a passive DNS (pDNS) system,
wherein the at least one model is trained on pDNS-based features including both of a quantity of name servers, where a domain had authoritative domain name system (DNS) records, and a quantity of administrative servers related to a domain,
wherein the at least one model is trained on lexical features including a quantity of digits, dashes, and total characters of a dictionary entropy of a domain name.

10. The method for detecting phishing domains of claim 9, wherein the classification prediction scores are generated prior to page content data becoming available for each domain in the set of domains.

11. The method for detecting phishing domains of claim 9, further comprising receiving page content data of at least one domain of the set of domains subsequent to generating the subset of domains; and updating the subset of domains based on the received page content data.

12. The method for detecting phishing domains of claim 9, further comprising training the at least one model with the updated subset of domains.

13. The method for detecting phishing domains of claim 9, further comprising removing domains from the set of domains for which a classification prediction score has been generated within a predefined amount of time prior to receiving the domain information.

14. A computer-readable, non-transitory medium storing instructions, which when executed by a processor, cause the processor to:
receive domain information maintained in a certificate transparency (CT) log for a set of domains;
generate, using at least one model, classification prediction scores for each of the domains based on the received domain information, wherein a classification prediction score is a likelihood that a domain is a phishing domain;
determine whether each generated classification prediction score meets a predetermined threshold; and
generate a subset of the set of domains, the subset including the domains having a classification prediction score that meets the predetermined threshold, and wherein the domains in the subset are classified as phishing domains,
wherein the at least one model is trained on CT log-based features, the CT log-based features comprising at least one of a quantity of uncertified gaps of a domain and a duration of time of the uncertified gaps of a domain,
wherein the domain information further includes information received from a passive DNS (pDNS) system for the set of domains,
wherein the at least one model is trained on pDNS-based features including both of a quantity of name servers, where a domain had authoritative domain name system (DNS) records, and a quantity of administrative servers related to a domain,
wherein the at least one model is trained on lexical features including a quantity of digits, dashes, and total characters of a dictionary entropy of a domain name.

15. The computer-readable, non-transitory medium of claim 14, wherein the classification prediction scores are solely based on the domain information and the lexical features extracted from each of the domains in the set of domains.

* * * * *